(12) United States Patent
Ligonniere et al.

(10) Patent No.: US 12,741,741 B2
(45) Date of Patent: Sep. 22, 2026

(54) PARTITION FOR AIRCRAFT SEAT ARRANGEMENT WITH SLIDING DOOR AND ASSOCIATED AIRCRAFT SEAT ARRANGEMENT

(71) Applicant: Safran Seats, Plaisir (FR)

(72) Inventors: Laurent Ligonniere, Moissy-Cramayel (FR); Olivier Cazalis, Moissy-Cramayel (FR); Mourad Rajhi, Moissy-Cramayel (FR); José Bernardo De Morais, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/717,001

(22) PCT Filed: Dec. 2, 2022

(86) PCT No.: PCT/FR2022/052235
§ 371 (c)(1),
(2) Date: Jun. 6, 2024

(87) PCT Pub. No.: WO2023/105145
PCT Pub. Date: Jun. 15, 2023

(65) Prior Publication Data

US 2025/0033772 A1 Jan. 30, 2025

(30) Foreign Application Priority Data

Dec. 7, 2021 (FR) ...................................... 2113067

(51) Int. Cl.
*B64D 11/00* (2006.01)

(52) U.S. Cl.
CPC ................................ *B64D 11/0023* (2013.01)

(58) Field of Classification Search
None
See application file for complete search history.

(56) References Cited

U.S. PATENT DOCUMENTS 12,208,900 B2 * 1/2025 Vuagniaux ......... B64D 11/0606
2008/0229547 A1 * 9/2008 Michel ............... B64D 11/0023
16/87 R (Continued)

FOREIGN PATENT DOCUMENTS

FR 3089952 A1 6/2020
WO 2017066559 A1 4/2017

(Continued)

OTHER PUBLICATIONS

International Patent Application No. PCT/FR2022/052235, International Search Report and Written Opinion, dated Feb. 23, 2023.

*Primary Examiner* — Joshua J Michener
*Assistant Examiner* — Cindi M Curry
(74) *Attorney, Agent, or Firm* — Kilpatrick Townsend & Stockton LLP

(57) ABSTRACT

A partition for an aircraft seat arrangement includes a fixed portion and a sliding door movable according to a sliding axis between an opening position in which the door is stowed into a compartment formed in the fixed portion and a closure position in which the door comes out of the compartment The partition further includes a main sliding device of the door comprising a sliding mount supporting the door, and a removable connection between the door and the mount which can be deactivated in the event of failure of the main sliding device.

6 Claims, 6 Drawing Sheets

(56) References Cited

U.S. PATENT DOCUMENTS

2008/0303399 A1* 12/2008 Huang .................. A47B 88/49
312/334.46
2012/0301062 A1* 11/2012 Huang ................ A47B 88/477
384/21
2017/0106980 A1* 4/2017 Kuyper .............. B64D 11/0604
2018/0163459 A1* 6/2018 Mathieu ................ F25D 23/082
2018/0194472 A1* 7/2018 Tremblay .............. B64C 1/1438
2021/0039790 A1* 2/2021 Robinson .............. E06B 3/5072
2021/0163139 A1* 6/2021 Bonnefoy .............. B64D 11/06
2023/0182902 A1* 6/2023 Vuagniaux ......... B64D 11/0606
244/118.6
2023/0287720 A1* 9/2023 Hoang ................ E05D 15/0652

FOREIGN PATENT DOCUMENTS

WO 2018184778 A1 10/2018
WO 2020020658 A1 1/2020

* cited by examiner

PARTITION FOR AIRCRAFT SEAT ARRANGEMENT WITH SLIDING DOOR AND ASSOCIATED AIRCRAFT SEAT ARRANGEMENT

TECHNICAL FIELD

The invention generally relates to arrangements of a cabin of a vehicle such as an aircraft.

In particular, the invention relates to aircraft cabin arrangements offering to the passengers, in particular business class passengers, private suites provided with a door leaf, such as a deployable door.

PRIOR ART

In aircraft equipped with such private suites, the door leaf is generally a sliding one and allows closing the partition between the passenger and the aisle of the aircraft, so as to define an intimate and isolated space for the passenger.

In an aircraft, one of the major concerns is the management of the weight of on-board cabin arrangements as well as the management of the installation density of the arrangements, while guaranteeing the comfort needs of the passengers and compliance with the safety requirements.

Such a partition with a deployable door might prove to be dangerous for the passenger in the event of an emergency, in the presence of a malfunction of the partition. Thus, in the event of malfunction once the door has been deployed, there is a risk of the door being blocked in position, making access to the emergency exits impossible.

Hence, the invention aims to enable the passenger to open the partition even in the event of malfunction, i.e. in the event of jamming in the closure position, in particular in the event of emergency evacuation.

Another aim is to propose such a system which complies with the same requirements of simplicity, lightweight and compactness as the partition itself.

Hence, an object of the invention is a partition for an aircraft seat arrangement comprising a fixed portion and a sliding door movable according to a sliding axis between an opening position in which the door is stowed into a compartment formed in the fixed portion and a closure position in which the door comes out of the compartment, the partition comprising a main sliding device of the door comprising a sliding mount supporting the door.

The partition comprises a removable connection between the door and the mount which can be deactivated in the event of failure of the main sliding device.

According to another feature of the invention, the removable connection can be deactivated by a force greater than a predetermined threshold exerted on the door according to a direction of the sliding axis in the direction of opening.

Preferably, the removable connection comprises releasable means for securing the mount to the door able to release the door under the effect of the force greater than the predetermined threshold.

In a first embodiment, the door comprises a shoulder arranged on an end of the door facing the fixed portion in the closure position of the partition, the securing means comprising two leaf springs arranged facing one another configured, on the one hand, to keep the shoulder in translation during the operation of the main device and, on the other hand, to move away under the effect of said force so as to release the shoulder during a failure of the main device.

In a second embodiment, the securing means comprise magnets facing one another respectively on the door and on the mount.

Another object of the invention is an aircraft seat arrangement comprising a seat and a partition as defined hereinabove.

Preferably, the partition is arranged so that the door in the closure position isolates the seat from an aisle of the aircraft.

BRIEF DESCRIPTION OF THE DRAWINGS

Other aims, features and advantages of the invention will appear upon reading the following description, given only as a non-limiting example, and made with reference to the appended drawings wherein.

DETAILED DISCLOSURE OF AT LEAST ONE EMBODIMENT

Figure 1:
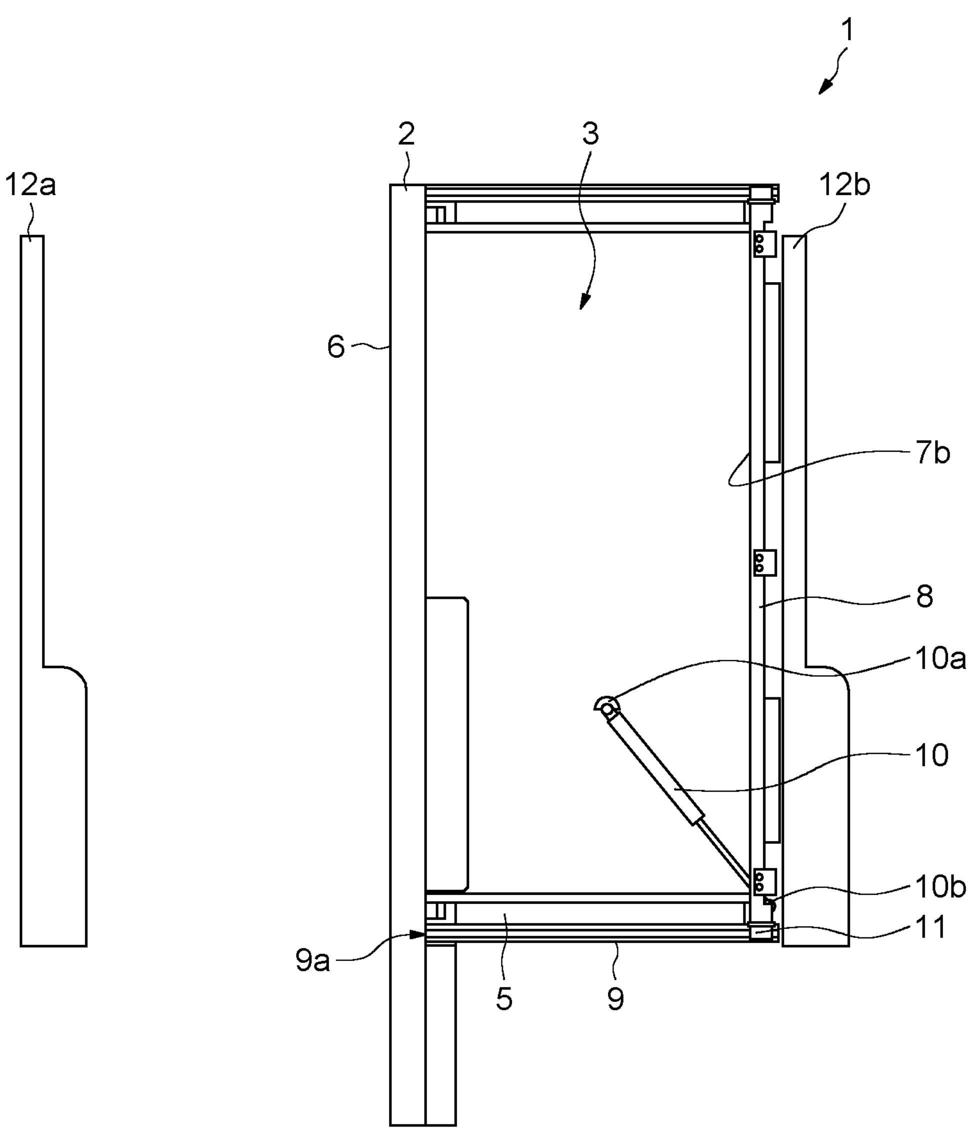
FIG. 1 illustrates a longitudinal section of a partition according to the invention in the opening position.
Figure 2:
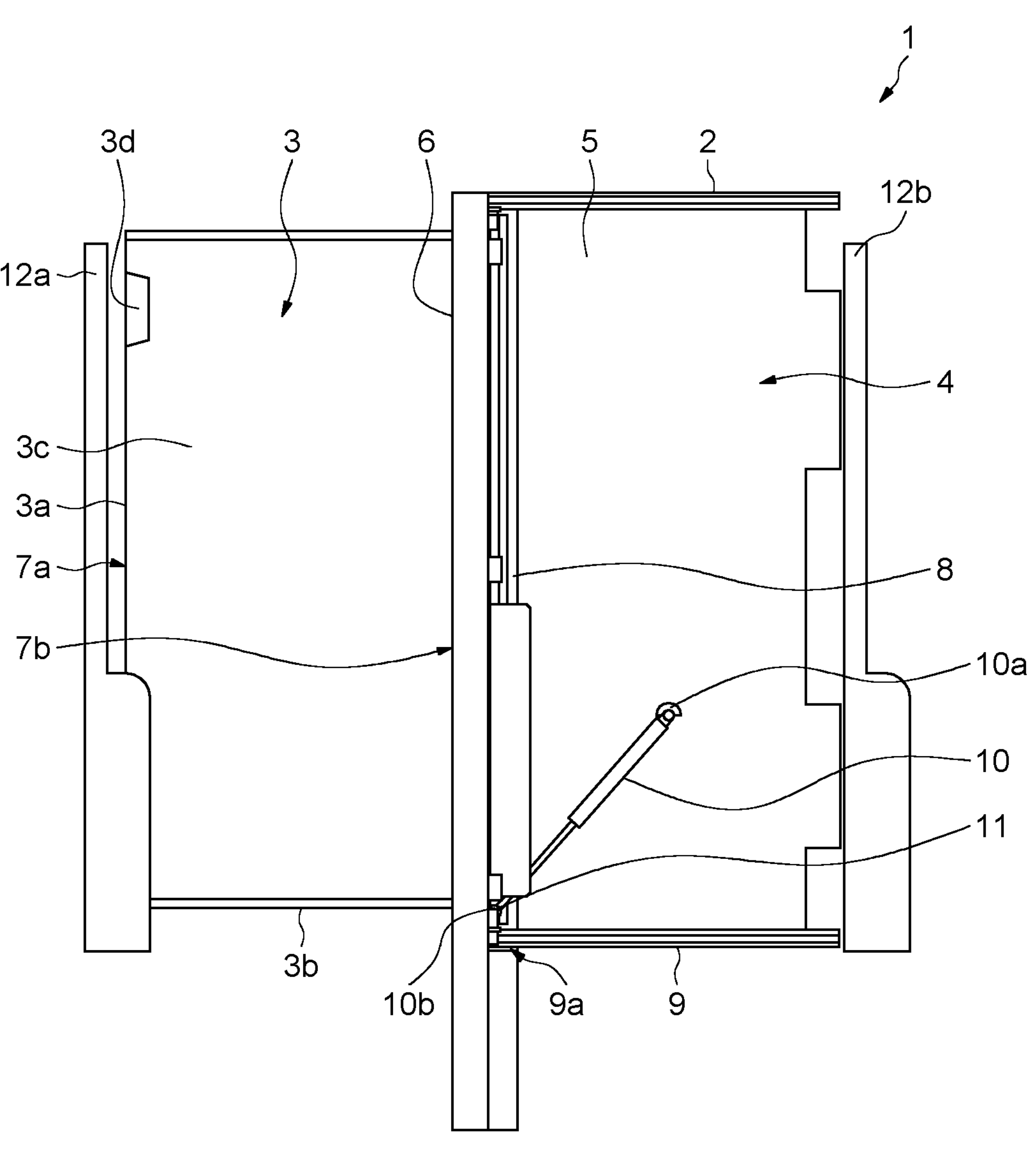
FIG. 2 illustrates a longitudinal section of a partition according to the invention in the closure position.

A longitudinal section of a partition 1 according to the invention is schematically shown in FIGS. 1 and 2.

The partition 1 is a partition intended in particular to be used in a vehicle to allow defining a passenger seat arrangement in a common space. For example, the vehicle may be an aircraft, the seat arrangement being intended to be installed in a business class part of the cabin.

The partition 1 comprises a fixed portion 2 and a sliding door 3 movable between an opening position shown in FIG. 1 in which the door 3 is stowed into a compartment 4 formed in the fixed portion 2 and a closure position shown in FIG. 2 in which the door 3 comes out of the compartment 4.

The fixed portion 2 is shown in FIGS. 1 and 2 in longitudinal section. The fixed portion 2 comprises an internal surface 5 parallel to the sliding door 3. The internal surface 5 may be the internal face of the wall of the fixed portion 2 or a surface fastened to the fixed portion 2 and arranged between the wall of the fixed portion and the plane containing the sliding door 3. In this second case shown in FIGS. 1 and 2, the internal surface 5 comprises a set of circular holes in order to save in the amount of material for manufacturing the surface 5, on the one hand, and to lighten the surface 5, on the other hand. The internal surface 5 is fixed relative to the fixed portion 2 throughout the movement of the movable door 3.

The fixed portion 2 is hollow as it comprises an internal cavity defining a compartment 4 intended to receive the sliding door 3. In addition, the fixed portion 2 comprises a lateral vertical opening 6 allowing access to the compartment 4.

The sliding door 3 is movable according to a sliding axis parallel to the internal surface 5 and passing through the opening 6. The sliding door 3 comprises a height 3$a$ and a width 3*b*, the width 3*b* being parallel to the sliding axis and the height 3*a* being perpendicular to this sliding axis and parallel to the opening 6.

For example, the sliding door 3 comprises a planar door panel 3*c* and a handle 3*d* positioned at one end of the door 7*a* which is opposite to another end of the door 7*b*, this other end 7*b* facing the fixed portion 2 in the closure position shown in FIG. 2.

In the opening position, the sliding door 3 is completely inserted into the compartment 4 and is therefore stowed. In this manner, the sliding door 3 is not an obstacle and the partition 1 comprises an opening enabling the passenger to pass. Conversely, in the closure position, the sliding door 3 is arranged completely outside the compartment 4 and therefore obstructs the opening. Hence, the partition 1 is closed and the passenger is isolated from the rest of the cabin of the aircraft.

The partition 1 comprises a device for mechanically assisting the movement of the sliding door 3.

The mechanical assist device comprises a sliding mount 8, a guide rail 9, and a bistable mechanical assist means 10.

The sliding mount 8 supports the sliding door 3 and is fixed relative to this door 3.

The guide rail 9 is arranged in the compartment 4, for example at the bottom of the compartment 4 so as to define the sliding axis of the door 3. Hence, the guide rail 9 is positioned so that the sliding door 3 could cross the opening 6 entirely during movement thereof on the rail 9 between the opening and closure positions. The guide rail 9 extends over a length substantially equal to the width 3*b* of the door. In addition, the guide rail 9 comprises a first end 9*a* arranged substantially at the level of the opening 6.

Possibly, the mechanical assist device comprises two guide rails 9, for example arranged respectively at the top and at the bottom of the compartment 4.

The sliding mount 8 comprises a means for sliding on the rail 9 such as a pad 11 mounted on the rail 9. Thus, the sliding mount 8 is able to make the door 3 slide between the opening and closure positions.

Figure 3:
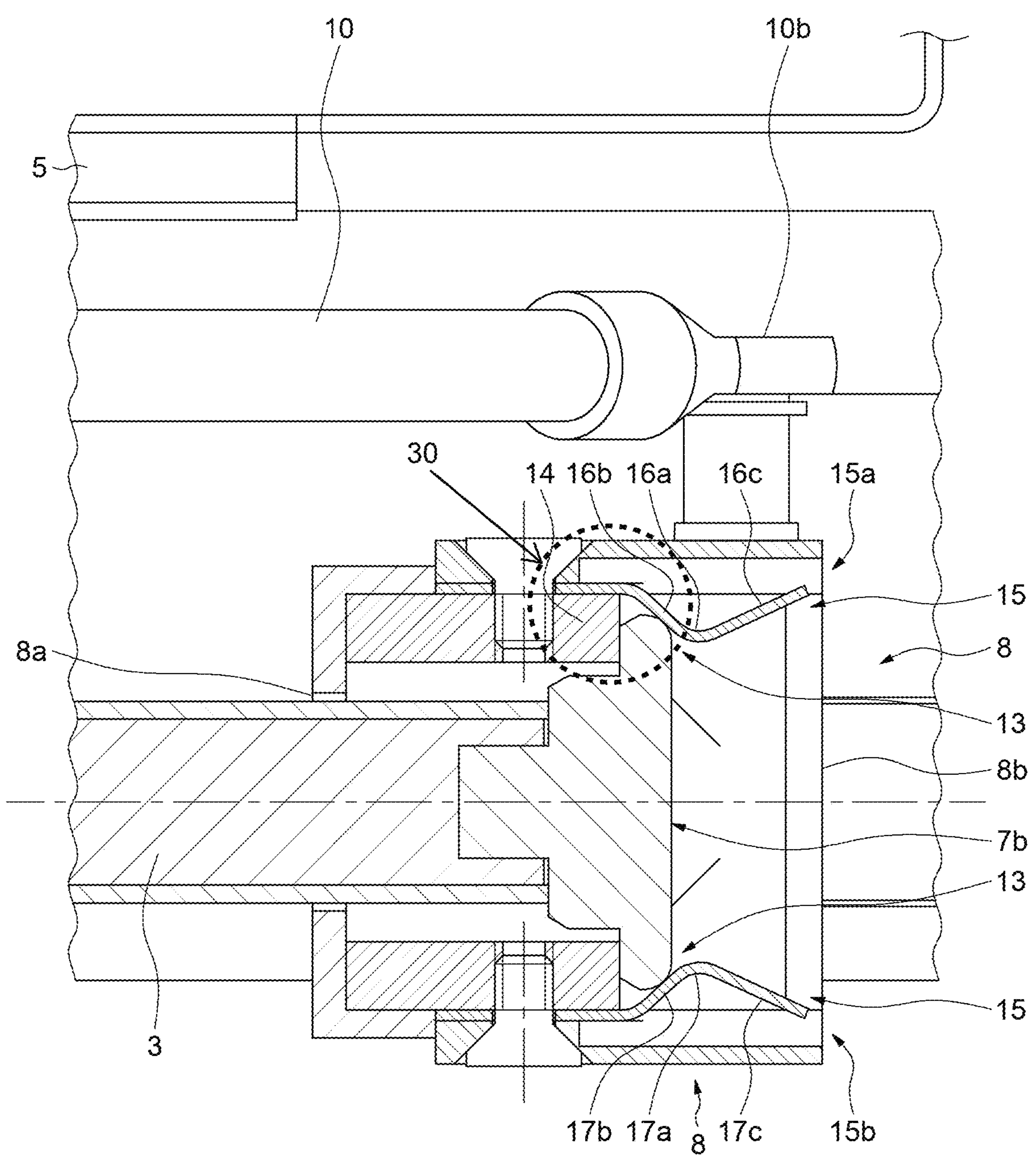
FIG. 3 illustrates a top sectional view of a first embodiment of a removable connection of the partition, in the attached position.

More particularly, the sliding mount 8 of the door 3 has a "U"-like profiled shape and clasps the door 3, as shown in FIG. 3. FIG. 3 illustrates a top view of the door 3 supported by the mount 8.

In one embodiment wherein two guide rails 9 are arranged at the top and at the bottom, respectively, of the compartment 4, the sliding mount 8 is "O"-like shaped and also clasps the door 3.

The sliding mount 8 is arranged at the end 7*b* of the door 3. In this manner, the length of travel of the pad 11 on the rail 9 is maximum so as to make the door 3 completely come out of the compartment 4 to closure position of the partition 1 and to stow it completely in the opening position.

The mechanical assist means 10 is a bistable gas cylinder. The bistable gas cylinder 10 is fastened at a first end 10*a* to the fixed portion 2 and at an opposite end 10*b* to the sliding mount 8. More specifically, the end 10*a* of the gas cylinder is fastened to the internal surface 5.

The gas cylinder is so-called bistable as it comprises two opposite stability positions corresponding respectively to the opening position and to the closure position. More specifically, the cylinder is fastened at its end 10*a* to the internal surface 5 of the fixed portion 2 at a midpoint between the position of the end 7*b* in the closure position and the position of the end 7*b* in the opening position of the partition 1.

Thus, during sliding of the door 3 through sliding of the mount 8, the end 10*a* remains fixed and the end 10*b* slides according to the sliding axis. Hence, the cylinder 10 is pivotably mounted about the axis perpendicular to the internal surface 5 and carrying the end 10*a*, and comprises a tilt point in its travel. Before having crossed this tilt point, the cylinder 10 brakes the movement of the mount 8 supporting the door 3 and thus tends to resist the movement between the opening and closure positions of the partition 1. However, after having crossed the tilt point, the cylinder 10 exerts on the mount 8 a pushing force tending to favor the movement between the opening and closure positions of the partition 1. The tilt point is located substantially at the middle of the travel of the mount 8 between the opening and closure positions.

Thus, the mechanical assist device acts on the door 3 between the opening and closure positions of the partition 1 and is adapted to apply a braking force and a pushing force throughout successive respective phases of the movement of the door 3 between the opening and closure positions.

The gas cylinder 10 is arranged so as to apply a force to the mount 8 when the door 3 is in the closure or opening position. In addition, the partition 1 comprises a first stop 12*a* and a second stop 12*b* which are vertical and arranged respectively on either side of the door 3 on the sliding axis defined by the rail 9.

More specifically, the stops 12*a* and 12*b* are possibly identical, and are arranged respectively on either side of the opening 6, and at a distance from the opening 6 equivalent to the width 3*b* of the door 3.

In this manner, the vertical end 7*a* of the door 3 bears against the first stop 12*a* in the closure position and the end 7*b* of the door 3 bears against the second stop 12*b* in the opening position.

In addition, the use of a gas cylinder allows controlling the extension speed of the door 3. Indeed, the cylinder is a low-power one and allows controlling the speed of movement of the door 3 and damping the end-of-travel positions, for example to reduce the risk of pinching in the closure position.

Hence, the mechanical assist device is able to hold the door 3 in the opening and closure positions. Thus, the partition 1 remains in the open or closed position irrespective of the flight incidence of the aircraft.

The mechanical assist device can be activated manually by the passenger via the handle 3*d* of the door 3.

More particularly, when the partition 1 is open, the door 3 is stowed into the compartment 4 of the fixed portion 2. The handle 3*d* being positioned on the end 7*a* of the door 3, it is accessible to the passenger. Hence, the passenger can pull on the door 3 in the direction of closure of the partition. The movement of the door 3 comprises two successive phases. During the first phase between the opening position and the tilt point, the passenger should pull on the door in the direction of closure strongly enough to counter the braking force of the gas cylinder 10. During the second phase between the tilt point and the closure position, the user can release the door 3, the cylinder exerting a pushing force moving the door 3 until closure of the partition 1.

The deployment mechanism of the door 3 thus resting essentially on the cylinder 10 in a bistable position, the device according to the invention is refined and allows gaining in lightweight by reducing the number of required parts. In addition, the simplicity of the device allows gaining in compactness. Indeed, the partition 1 according to the invention can be used for an aircraft cabin with a short pitch in the range of 34 inches, while complying with the so-called Egress standards for space necessary for evacuation.

In addition, the deployment mechanism is supported by simple, reliable and interchangeable mechanical members.

Moreover, the partition 1 comprises a removable connection between the door 3 and the mount 8. This connection, a first embodiment of which is shown in FIG. 3, is intended to secure the door 3 to the mount 8 in order to enable sliding of the door 3 through sliding of the mount 8. This connection also enables the passenger to handle the door 3 in the event of failure of the mechanical assist device or of the deployment mechanism of the door 3.

Thus, it enables opening of the door 3 in the event of jamming of the deployment mechanism in the closed position of the door 3.

The removable connection comprises releasable means for securing the mount 8 to the door 3.

In a first embodiment illustrated in FIG. 3, the releasable securing means comprise a shoulder 13 arranged at the end 7*b* of the door 3, an internal stop element 14 of the mount 8 and leaf springs 15.

The shoulder 13 is arranged at the end 7*b* of the door 3 and is fastened to this end 7*b*. The shoulder 13 extends perpendicularly to the door 3 and on either side of the door 3. More specifically, the mounting 8 clasps the door 3 at the level of the end 7*b* and the shoulder 13.

The internal stop element 14 is arranged in the mount 8 between the shoulder 13 and a first vertical end 8*a* of the mount 8 facing the opening 6, in the opening position of the partition 1. Thus, when the door 3 is pulled by a passenger in the direction of closure of the partition 1, the shoulder 13 abuts against the element 14 and applies a force on the mount 8 so as to make it slide with the door 3.

The shoulder 13 is kept pressed against the internal stop element 14 by leaf springs 15. More specifically, the leaf springs 15 comprise two leaf springs 15*a* and 15*b* respectively comprising at least one leaf, this leaf being convex with respect to the door 3. The springs 15*a* and 15*b* are arranged symmetrically with respect to the sliding axis inside the mount 8, between the internal stop element 14 and a second vertical end 8*b* opposite to the end 8*a*. The convexity of the leaf springs 15*a* and 15*b* defines a narrowing of the axis of passage of the door 3 in the mount 8, which blocks the shoulder 13 in position against the internal stop element 14. Thus, when the shoulder 13 is immobilized between the internal stop element 14 and the leaf springs 15, the door 3 is secured to the mount 8.

The maximum narrowing of the axis of passage of the door 3 in the mount 8 is positioned at the respective vertices 16*a* and 17*a* of the convexities of each spring 15*a* and 15*b*. Thus, the leaf springs 15*a* and 15*b* respectively comprise two portions 16*b* and 16*c* for the spring 15*a*, and two portions 17*b* and 17*c* for the spring 15*b* such that the portions 16*b* and 17*b*, respectively 16*c* and 17*c*, face one another and are symmetrical with respect to the axis of passage of the door 3 in the mount 8. More specifically, the portions 16*b* and 17*b* are brought close to each other up to their respective ends formed by the vertices 16*a* and 17*a*, and the portions 16*c* and 17*c* are brought away from each other from the vertices 16*a* and 17*a*, respectively.

The shoulder 13 is immobilized between the internal abutment element 14 and the portions 16*b* and 17*b*.

The removable connection can be deactivated so that, in the event of jamming of the mount 8, the door 3 is detached and could be brought back into the opening position of the partition 1.

More specifically, the connection between the mount 8 and the door 3 can be deactivated by the action of a force greater than a predetermined threshold exerted on the door 3 according to a direction of the sliding axis. Thus, when the mechanical assist device malfunctions and the mount 8 supporting the door 3 is blocked on the rail 9 in a position in which the door is partially or completely arranged outside the compartment 4, the passenger pushes strong enough on the door 3 according to the axis of the rail 9 towards the fixed portion 2 to release the door by clearing it from the springs.

Indeed, the shoulder 13 is in contact with the portions 16*b* and 17*b* of the leaf springs 15 approaching each other. In this manner, when the mount 8 is blocked on the rail 9 and the passenger pushes on the door 3 in the corresponding direction, the shoulder 13 of the end 7*b* exerts a force on the portions 16*b* and 17*b* tending to bring them away from the axis of passage of the door 3. When the pushing force exceeds a predetermined threshold, the springs 15*a* and 15*b* are separated enough from each other to enable the shoulder 13 to slide therebetween. The door 3 is then no longer held in the direction of the compartment 4, and the passenger can enter it into the compartment 4 and thus open the partition 1.

Figure 4:
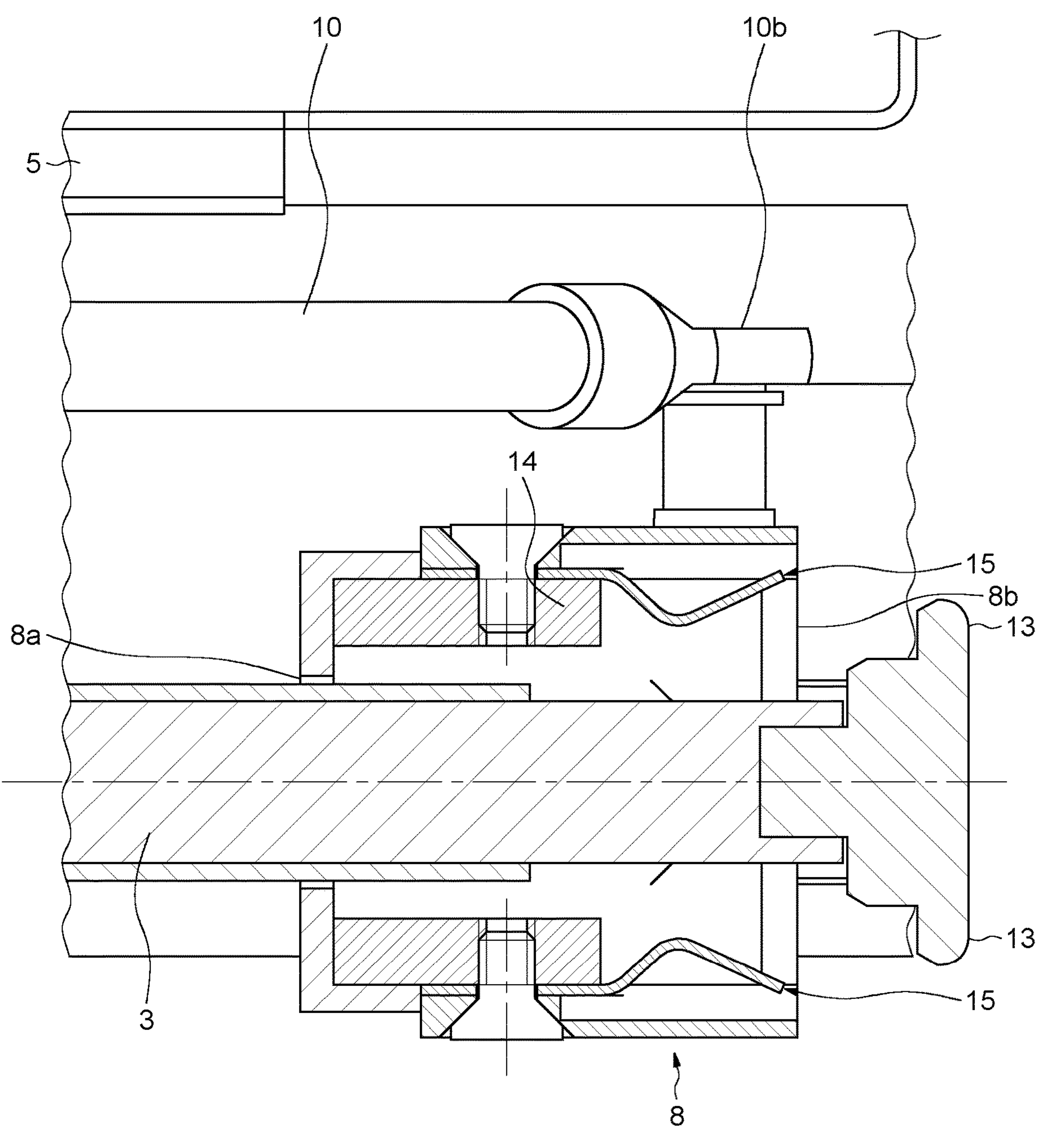
FIG. 4 shows the removable connection of FIG. 3, in the detached position.

FIG. 4 illustrates a view of the first embodiment of FIG. 3 wherein the door 3 and the shoulder 13 are released from the securing means. The springs 15*a* and 16*a* have recovered their initial shape after passage of the shoulder 13. The initial spacing between the vertices 16*a* and 17*a* is larger than the thickness of the door 3, the door 3 is no longer slidably secured to the stop 12*b* with the mount 8. Hence, the passenger can exert a push on the door 3 so as to enter it into the compartment 4.

In addition, when the passenger pulls on the door 3 in the reverse direction, i.e. in the direction of the stop 12*a*, the shoulder 13 can carry out the reverse operation and exert a force on the springs 15 so that the portions 16*c* and 17*c* are brought away from each other enabling passage of the shoulder 13. The shoulder 13 is then in the initial position of FIG. 3 and the door 3 is again secured to the mount 8.

Preferably, the partition 1 may comprise a set of such removable connections evenly arranged on the end 7*b* of the door 3. For example, the partition 1 comprises three removable links on the end 7*b*, respectively at the top, at the bottom and at the middle of the end 7*b*.

Figure 5A:
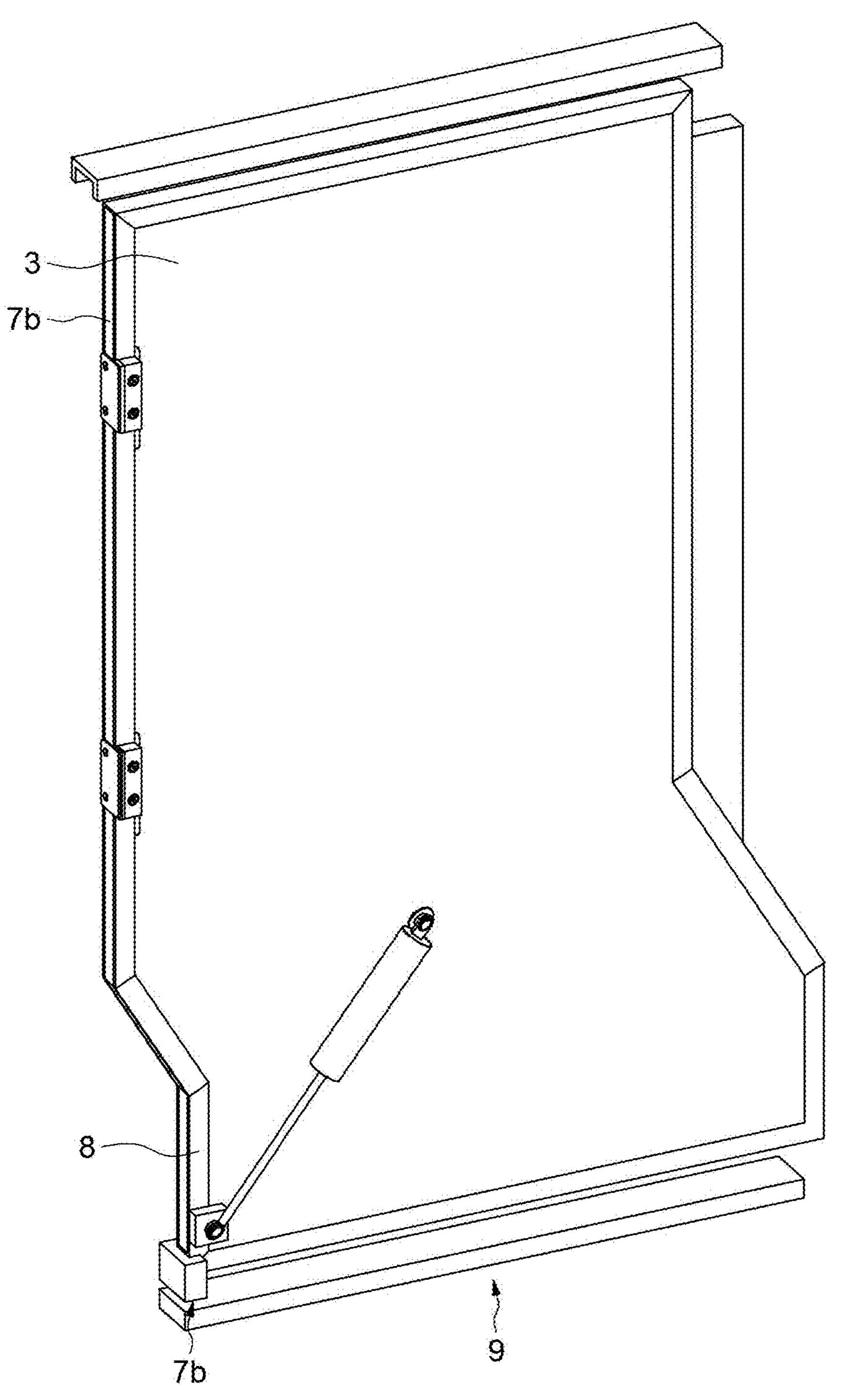
FIG. 5A illustrates a partition comprising a removable connection according to a second embodiment.
Figure 5B:
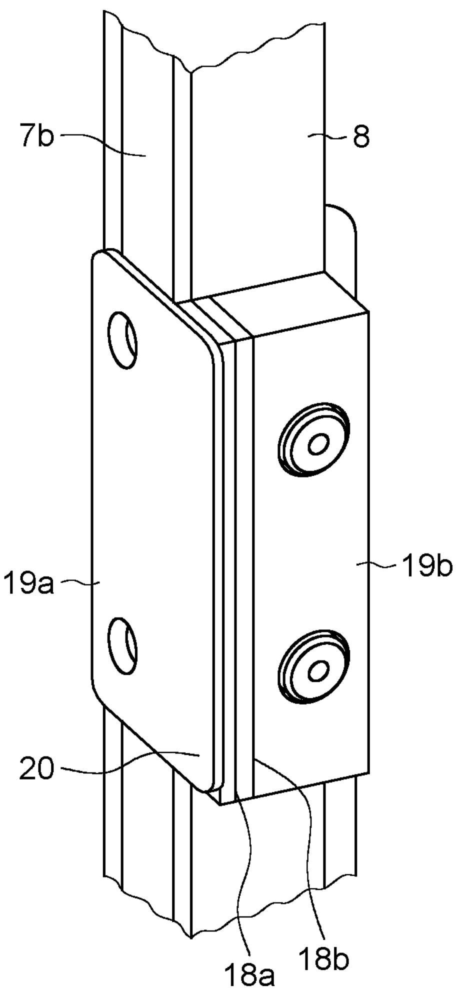
FIG. 5B illustrates a perspective view of the removable connection of FIG. 5A.

A second embodiment of the removable connection is shown in FIGS. 5A and 5B.

FIG. 5A shows the partition 1 equipped with two removable connections according to the second embodiment, and FIG. 5B shows a perspective view of a removable connection according to the second embodiment.

In the second embodiment, the removable connection comprises two magnets 18*a* and 18*b*. The magnet 18*a* is fastened to the door 3 and the magnet 18*b* is fastened to the mount 8. Securing the door 3 to the mount 8 is ensured by the reciprocal attraction of the magnets 18*a* and 18*b*.

More specifically, the magnet 18*a* is fastened to the door 3 via a first support 19*a*, and the magnet 18*b* is fastened to the mount 8 via a second support 19*b*. The supports 19*a* and 19*b*, and the magnets 18*a* and 18*b* are arranged respectively on the door 3 and the mount 8 so that the axis of connection between the magnets 18*a* and 18*b* is parallel to the sliding axis of the door 3, but not coincident with it. More specifically, the support 19*a* is a plate arranged across the thickness of the end 7*b* of the door 3, i.e. over the surface of the door 3 facing the stop 12*b*. In addition, the support 19*a* extends perpendicularly beyond the door 3 so as to define a heel 20 on which the magnet 18*a* is arranged. Also, the support 19*b* is fastened on a surface of the mount 8 parallel to the door 3, and the magnet 18*b* is arranged on the support 19*b*. In this manner, when the mount 8 is blocked, the passenger can exert a pushing force on the door 3 in the direction of the stop 12*b* greater than a predetermined threshold of the attraction force of the magnets 18*a* and 18*b*. The magnets 18*a* and 18*b* are then detached, like the door 3 and the mount 8. The axis of connection between the magnets 18*a* and 18*b* being parallel, but not coincident, with the sliding axis of the door 3, the pushing force exerted by the passenger causes sliding of the door 3 so as to retract the door 3 into the compartment 4.

Thus, in both embodiments, the removable connection can be deactivated by a push exerted on the door according to a direction of the sliding axis

The invention claimed is:

1. A partition for an aircraft seat arrangement comprising a fixed portion and a sliding door movable according to a sliding axis between an opening position in which the door is stowed into a compartment formed in the fixed portion and a closure position in which the door comes out of the compartment, the partition comprising a main sliding device of the door comprising a sliding mount supporting the door, characterized in that it comprises a removable connection between the door and the mount enabling sliding of the door through sliding of the mount, said removable connection being able to detach the door from the mount in an event of jamming of the mount, wherein the removable connection can be deactivated by a force greater than a predetermined threshold exerted on the door according to the sliding axis in the direction of opening.

2. The partition according to claim 1, wherein the removable connection is configured to release the door under the effect of the force greater than the predetermined threshold.

3. The partition according to claim 1, wherein the door comprises a shoulder arranged on an end of the door facing the fixed portion in the closure position of the partition, the removable connection comprising two leaf springs arranged facing one another configured, on the one hand, to keep the shoulder in translation during the operation of the main device and, on the other hand, to move away under the effect of said force so as to release the shoulder during a jamming of the mount.

4. The partition according to claim 1, wherein the removable connection comprise magnets facing one another respectively on the door and on the mount.

5. An aircraft seat arrangement comprising a seat and a partition according to claim 1.

6. The arrangement according to claim 4, wherein the partition is arranged so that the door in the closure position isolates the seat from an aisle of an aircraft.

* * * * *